US000001490H

United States Statutory Invention Registration [19]

[11] Reg. Number: H1490

Thompson et al.

[43] Published: Sep. 5, 1995

[54] MARINE GEOPHYSICAL PROSPECTING SYSTEM

[75] Inventors: Arthur H. Thompson; Grant A. Gist; James A. Rice, all of Houston, Tex.

[73] Assignee: Exxon Production Research Company, Houston, Tex.

[21] Appl. No.: 152,972

[22] Filed: Nov. 15, 1993

Related U.S. Application Data

[63] Continuation of Ser. No. 952,366, Sep. 28, 1992, abandoned.

[51] Int. Cl.[6] ..... G01V 1/40

[52] U.S. Cl. ..... 367/15; 367/20; 367/154; 324/365

[58] Field of Search ..... 367/15, 20, 153, 154, 367/106, 131; 324/323, 365; 181/110, 112; 342/22

[56] References Cited

U.S. PATENT DOCUMENTS

| | | | |
|---|---|---|---|
| 2,156,259 | 5/1939 | Blau | 367/14 |
| 2,172,557 | 9/1939 | Evjen | 324/354 |
| 2,172,778 | 9/1939 | Taylor, Jr. | 324/354 |
| 2,729,300 | 1/1956 | Paslay et al. | 367/15 |
| 3,392,327 | 7/1968 | Zimmerman, Jr. | 324/344 |
| 3,660,754 | 5/1972 | Tsao et al. | 324/333 |
| 4,009,609 | 3/1977 | Sayer et al. | 73/155 |
| 4,160,229 | 7/1979 | McGough | 367/15 |
| 4,298,840 | 11/1981 | Bischoff et al. | 324/365 |

(List continued on next page.)

OTHER PUBLICATIONS

Ser. No. 07/696,059 filed on May 6, 1991 by Thompson, et al.

(List continued on next page.)

*Primary Examiner*—Ian J. Lobo

[57] ABSTRACT

A marine geophysical prospecting system employs a hydrophone streamer cable containing electromagnetic field sensors, modified to be towed at a preselected distance above the sea floor by a first marine vessel senses electromagnetic energy from selected substrata beneath bodies of water. The voltage between sensors may be amplified by amplifiers in the cable or by amplifiers aboard the towing vessel. Optionally, a second similarly modified cable is preferably located above the near-bottom cable. Both cables may also contain hydrophones and/or accelerometers, as well as depth and position sensors. Optionally, a second vessel tows at least one conventional seismic source to create compressional energy which propagates downwardly through the water into the substrata beneath the body of water. At appropriate porous subsurface formations, the acoustic energy is converted to electromagnetic energy. This electromagnetic energy propagates upwardly and is detected by the electromagnetic sensors in the near-bottom cable; the second cable provides a reference array to suppress electromagnetic noise. Alternatively, the electromagnetic sensors in the near-bottom cable and a power source on the towing vessel may create an alternating or pulsed electromagnetic field in the sea floor. This electromagnetic field travels into the substrata beneath the water body and via conversion of the electromagnetic waves into seismic pressure waves at other appropriate porous subsea earth formations, generates a seismic wave. The resulting seismic wave is detected by the hydrophones and/or accelerometers in the cables.

13 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 4,516,227 | 5/1985 | Wener et al. | 367/15 |
| 4,541,079 | 9/1985 | Thigpen | 367/19 |
| 4,617,518 | 10/1986 | Srnka | 324/365 |
| 4,742,402 | 5/1988 | Sobolev et al. | 360/6 |
| 4,774,469 | 9/1988 | Sobolev et al. | 367/14 |
| 4,904,942 | 2/1990 | Thompson | 324/323 |
| 5,148,406 | 9/1992 | Brink et al. | 367/20 |

OTHER PUBLICATIONS

The Journal of Chemical Physics, vol. 43, No. 6, pp. 2111–2115 (1954) by Morrison et al.

Journal of Non–Equilibrium Thermodynamics, vol. 14, No. 4, pp. 345–354 (1989) by de las Nieves et al.

Journal of Colloid and Interface Science, 59, p. 149 [1977], by John L. Anderson and Wei–Hu Koh.

Journal of Acoustic Society of America 77 (6), p. 2012 [1985], by A. N. Norris.

NSF Report (Jan. 27, 1988) by H. F. Morrison and T. Asch.

MARINE GEOPHYSICAL PROSPECTING SYSTEM

This is a continuation of application Ser. No. 07/952,366 filed on Sep. 28, 1992, now abandoned.

BACKGROUND OF THE INVENTION

This invention relates generally to marine geophysical prospecting of earthen substrata beneath bodies of water and, more particularly, to a marine geophysical prospecting system for sensing energy converted by selected substrata.

Marine seismic exploration is usually conducted by towing a seismic streamer at a given depth through the ocean or other body of water. The streamer is provided with a plurality of pressure sensors, such as hydrophones, disposed at appropriate intervals along the length thereof. Acoustic wave energy is provided in the vicinity of the cable by an air gun or other suitable source means. Acoustic energy from the source travels through the water and downwardly through the earth with a portion of it being reflected upwardly at strata interfaces where there is a contrast in the acoustic impedance characteristics between two strata. The plurality of reflections (or refractions) of the source waves generates a sequence of upwardly traveling waves that are distributed in time. The pressure sensors in the streamer cable detect the pressure waves produced in the water by the upwardly traveling waves and provide electrical signals indicative thereof to suitable processing and recording equipment located on a seismic vessel that is towing the streamer cable.

Conventional seismic techniques have difficulty in resolving closely-spaced substrata. Additionally, such conventional seismic methods, while providing high-quality information on the geological structure of the subsurface, do not easily provide information about porosity, permeability, and fluid saturation. Consequently, more accurate information on these parameters is continuously sought by explorationists. It has been found that the conversion at subsurface interfaces of acoustic energy to electrical energy by the streaming potential or of electrical energy to acoustic energy by the "electroosmotic effect" yields additional information on these parameters not easily obtained from conventional seismic techniques. The present assignee's related application, Ser. No. 07/696,059, and U.S. Pat. No. 4,904,942, detail electroseismic systems which overcome many of these disadvantages by employing electroacoustic and acoustoelectric techniques, respectively, to gather data on land. However, these systems do not address the use of the electroacoustic or acoustoelectric technique in the offshore environment, the characteristics of which differ greatly from those of a land-based setting.

These and other limitations and disadvantages of the prior art are overcome by the present invention, however, and an improved method is provided for marine geophysical prospecting of substrata beneath bodies of water.

SUMMARY OF THE INVENTION

In a preferred embodiment of the present invention a marine geophysical prospecting system for sensing energy converted by selected substrata beneath bodies of water is provided. More particularly, apparatus for conducting marine geophysical prospecting and methods for marine geophysical prospecting are provided.

In a preferred apparatus of the present invention a conventional hydrophone streamer cable is modified to be towed at a preselected but adjustable small fixed distance above the sea floor by a first marine vessel. The cable is modified to contain electromagnetic field sensors mounted on the outside surface of the cable, where they are exposed to the water; these sensors may be conductive electrodes, rings or pads. These conductive electrodes are preferably composed of corrosion-resistant metal designed to maintain good electrical contact with the sea water. The voltage developed between pairs of electrodes may be amplified by distributed amplifiers located in the cable or by a centralized amplifier (or amplifiers) aboard the towing vessel. Optionally, the apparatus of the present invention also includes a second similarly modified streamer cable towed by the first vessel at a preselected, but adjustable, fixed distance above the first cable for purposes of noise reduction, but this second cable is not required.

The apparatus also includes one or more marine seismic sources, optionally towed by a second marine vessel. These seismic sources are standard marine seismic sources such as, for example, but not limited to air and/or gas guns. The use of a second vessel allows the geometry between the sources and the cables to be varied. This allows for end-on, or mid-cable geometry shooting configurations to be employed. Mid-cable geometry is preferred so that both positive and negative source to receiver offsets are available.

According to the methods of the present invention, seismic sources are energized, creating compressional energy which propagates downwardly through the water into the substrata beneath the body of water. At appropriate porous subsurface formations, the acoustic energy is converted to electromagnetic energy. This electromagnetic energy propagates upwardly and may be detected by appropriate electrodes in contact with the sea water of a modified streamer cable operating adjacent the sea bottom. A second optional cable located above the first cable provides a reference array that may be used to suppress any electromagnetic (or acoustic) noise detected by the first cable.

Alternatively, and also in accordance with the methods of the present invention, the electrodes (transceivers) in the near bottom cable may be driven by an electric power source on the towing marine vessel to create alternating electromagnetic fields in the sea water and in the sea floor. These electromagnetic waves propagate into the substrata beneath the body of water where they may be converted at appropriate porous subsurface formations into a seismic pressure wave. The resulting seismic wave then travels upwardly through the substrata into the water where it is detected by the hydrophones and/or accelerometers in the near-bottom cable and the upper cable at a later time. For this embodiment, the upper cable may also be used as a source of electromagnetic waves and may be "tuned" with the near bottom cable to generate a downward signal of maximum intensity by altering the phase shift or time delay between the signals of each cable.

It is a feature of the present invention to provide a method for marine geophysical prospecting of substrata beneath bodies of water.

It is a feature of the present invention to provide a marine geophysical prospecting system for exploring substrata beneath bodies of water.

It is also a feature of the present invention to provide a method for marine geophysical prospecting comprising generating electromagnetic energy adjacent the bottom of a body of water, converting at least a portion of the electromagnetic energy into seismic energy at selected subsurface formations, and detecting said seismic energy in said body of water.

It is a further feature of the present invention to provide a new method of geophysical prospecting using both the electroacoustic and acoustoelectric conversion phenomenon.

It is yet another feature of the present invention to provide apparatus for a new type of geophysical prospecting.

These and other features and advantages of the present invention will become apparent from the following detailed description, wherein reference is made to the figures in the accompanying drawings.

DETAILED DESCRIPTION OF THE INVENTION

Figure 1:
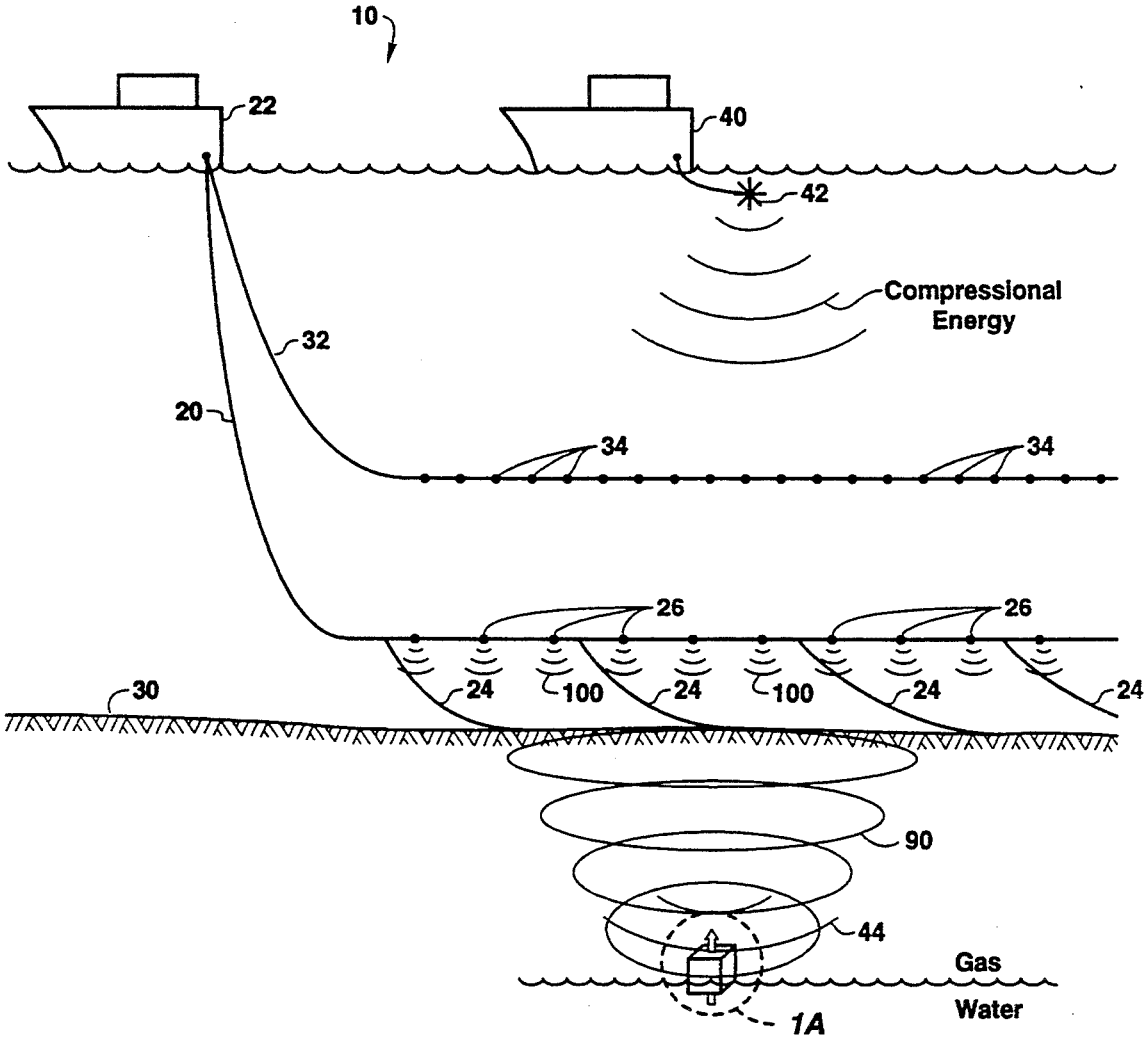
FIG. 1 is a schematic depiction of the components of an illustrative embodiment of the marine geophysical prospecting system of the present invention.

Referring to FIG. 1, a marine geophysical prospecting system for sensing energy converted by selected substrata beneath a body of water is provided generally at 10. In a presently preferred embodiment a conventional hydrophone streamer cable 20 is modified to be towed at a preselected but adjustable distance from the water bottom 30 by a first marine vessel 22. This preselected distance is fixedly adjustable and varies from being on the bottom to about one hundred feet above the sea bottom or floor 30, and is preferably about one to about twenty feet above the sea bottom 30.

The modified cable 20 may be a streamer cable having a plurality of chains 24 (of a fixed length and size) connected at preselected points having fixed or variable spacings along the cable 20. Other weights for cable 20 may be employed in lieu of, or in combination with the chains. The chains 24 provide negative buoyancy to the cable 20 causing it to sink until the chains 24 contact the bottom 30 and sufficient chain weight is on the bottom 30 to make the cable 20 neutrally buoyant. At this point the cable 20 will float a fixed distance above the bottom 30 (based upon chain size and weight) and may be towed at this depth. By adjusting the chain size and weight, the depth of the cable 20 and its distance above the bottom 30 may be adjusted. The length of the chains 24 is preferably selected to provide a minimum amount of chain on the sea floor or water bottom 30 to minimize fouling on any obstructions on the bottom. The bottommost "links" of the chains 24 may be a solid rod or other shape, or the openings in links may be "sealed" with plastic. In addition, shear links (not shown) that are easily broken if caught on an obstruction may also be employed in the upper and/or lower part of the chain.

The cable 20 may contain hydrophones and/or accelerometers, as well as depth and position sensors. The depth sensors are used to determine the actual depth or "height" above the sea bottom 30. The cable 20 is also modified to contain electromagnetic field sensors or electrodes 26, that may be conductive rings or pads exposed to the water. Preferably, these sensors 26 are on the exterior surface of the cable; however, they may also be inside the cable, i.e. in a compartment open to sea water via openings in the cable's exterior surface. These conductive electrodes 26 are preferably composed of corrosion-resistant metal designed to maintain good electrical contact with the sea water. The electrodes 26 are positioned along the cable with the spacing between electrodes varying from about one to one thousand feet. Generally, the spacing between electrodes is determined based upon considerations well known in the art, such as determining spacing depending upon the desired resolution. In general, smaller spacings allow more operational flexibility. In addition, as is also well known in the art, the electrodes may be connected in groups and the groups may overlap.

Short electrode spacings may be used advantageously to reject undesirable field components, such as horizontally propagating electric waves. As a rule of thumb, the modified cable 20 measures the horizontal variation in the electric field that is representative of the field in the sea floor, and the horizontal sensitivity will be maximized when the elevation of the cable above the sea floor is less than the electrode 26 spacing; however, this elevation versus spacing rule is not absolute and the elevation may be up to about two to three times the electrode spacing and still detect an electric field. The voltage developed between two adjacent electrodes 26 (i.e. a pair of electrodes) is a measure of the electric field in the water. The sensed voltage between electrodes may be amplified by distributed amplifiers (not shown) contained in the cable or by a centralized amplifier (or amplifiers) (not shown) aboard the towing vessel.

Preferably, but optionally, a second similarly modified streamer cable 32 is located a preselected, but adjustably fixed distance above the first cable 20. This second cable 32 may be located from about ten to one hundred feet above the first cable 20. The second cable 32 provides a "reference" receiver array that may be used to suppress interference from acoustic energy multiples or ghosts in the water column and may be used as a reference for electromagnetic noise suppression. When used as an electromagnetic noise suppression device, the upper cable 32 measures the background electric field strength by means of electromagnetic field sensors or electrodes 34. This background noise will show up as similar phase and frequency components for both cables. The desired signal should be well attenuated by the time it reaches the second cable. Thus, a cross-correlation calculation (or correction) would be employed to identify components that have a similar phase and frequency and allow for removal of such noise.

In addition, a second optional marine vessel 40 is preferably employed for towing one or more seismic sources 42. These seismic sources are standard marine seismic sources such as air and/or gas guns and may be deployed as one or more arrays of such sources. The use of a second vessel 40 allows the shooting and acquisition geometry between the sources and the cables to be varied. The shooting geometry may be end-on, but is preferably mid-cable so that both positive and negative source to receiver offsets are available.

Figure 1A:
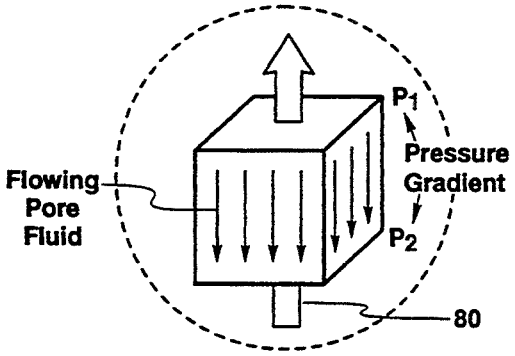
FIG. 1A is an enlarged view of a portion of the subsurface showing the electric field induced by the downwardly propagating compression energy.

The seismic sources 42 are energized in a conventional manner creating compressional energy which propagates downwardly through the water into the earthen substrata beneath the body of water. At appropriate porous subsurface formations, at least a portion of the acoustic energy or seismic wave 44 is converted to electromagnetic energy. As the seismic wave 44 passes through an appropriate porous formation, the interstitial fluid in the formation is displaced in an upward or downward direction (depending on the polarity of the incident seismic wave). This displacement causes a segregation of electrochemical bonds between the fluid and rock, creating a dipole and a resulting electric field, known as the streaming potential 80, which propagates in a vertically upward direction (see FIG. 1A). This process is more completely described in the present assignee's U.S. Pat. No. 4,904,942. Similarly, the present assignee's pending application Ser. No. 07/696,059 describes a process that is an electric field to an acoustic field (seismic wave) conversion by the electroosmotic effect. Both of these documents are hereby incorporated by reference. The upwardly-propagating electromagnetic energy 90 may be detected by the electrodes 26 in the modified streamer cable 20 that are in contact with the sea water and that are adjacent the sea bottom 30. The second cable 32 located above the first cable 20 again provides a reference array that may be used to suppress electromagnetic and acoustic noise. That is, the signals from the second cable are compared to the signals from the first cable and components having common frequency and phase are removed.

Alternatively, and in accordance with methods of the present invention, the electrodes 26 in the near-bottom cable 20 may be driven by an electric power source (not shown) on the towing vessel 22 to create alternating electromagnetic fields 100 in the sea water and proximate the sea floor 30. For this method, the electrodes 26 are electromagnetic energy transceivers; that is, they may be employed as a receiver for or a transmitter of electromagnetic energy. The frequency of the source may range from 1 milliHz to about 30 kHz. These electromagnetic waves propagate into the substrata beneath the body of water. It should be noted that this electromagnetic wave, unlike a seismic wave, travels with the speed of light in the subsurface, which is less than the speed of light in the vacuum but is nevertheless many times that of the speed of sound in the subsurface. The applied electric field 100 encounters fluid dipoles 120 associated with at least one fluid in a porous earth formation. A portion of such a formation is depicted in an exploded view in FIG. 2. This formation is porous, containing solid rock portions 201 interspersed with channel-like porous spaces 202. The term "porous" is used herein to mean some earth substance containing non-earthen volume or pore space, and includes, but is not limited to, consolidated, poorly consolidated, or unconsolidated earthen materials. Where aqueous or polarizable fluid exists, an electrochemical bond may be formed between the aqueous or polarizable fluid and the solid rock portions 201. The aqueous fluid may be water, brine, or hydrocarbons. This electrochemical bond is represented by the "+" symbol in the fluid portion and the "−" symbol in the rock portion of the formation.

Figure 2:
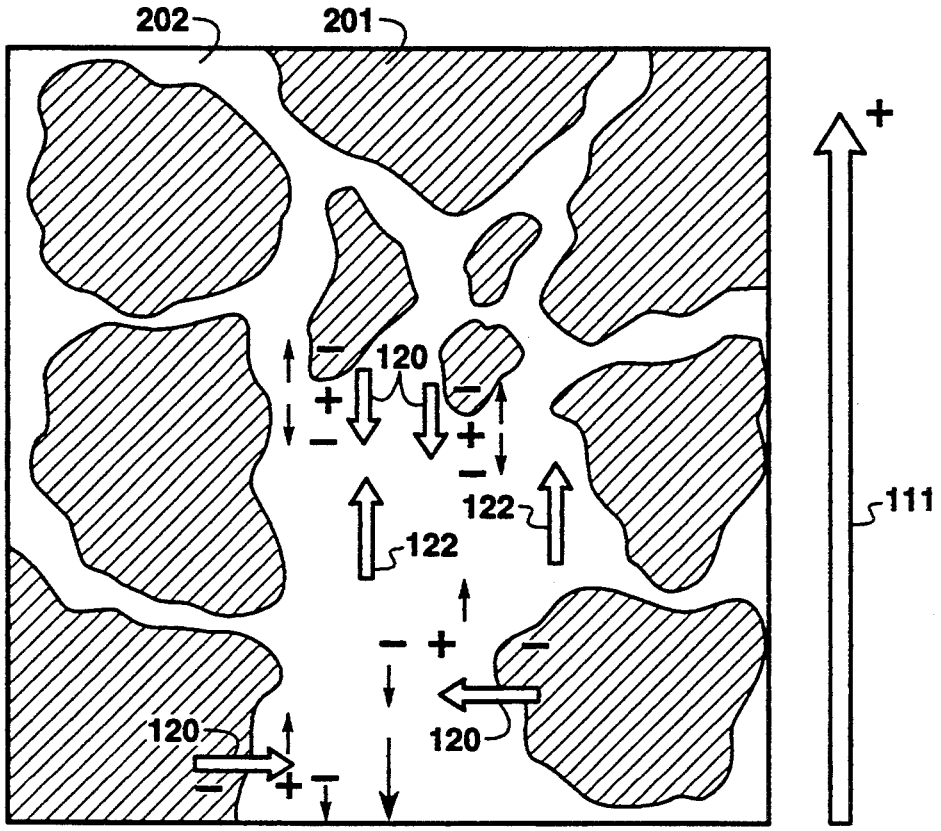
FIG. 2 is a partial cross-sectional view of a porous formation suitable for generating a seismic wave in response to an electric field stimulation in accordance with the teachings of the present invention.

In general, the rock portion 201 has an existing natural surface charge. This electrochemical bond may result in a local pore fluid dipole that causes a local background pre-existing electric field. It should be noted, however, that overall, there is no net dipole in unperturbed rock and its associated fluids. The sign of the background field or polarity direction depends on the surface charge on the solid and the way the fluid screens out that charge. In clays, the charge is typically as shown in FIG. 2. However, in carbonates, the charge could well be reversed. This applied electric field 100 causes a change in the polarization of the dipoles 120 in the pore fluid. Although the electric field may be a "pulsed" or "AC" field (i.e., one resulting from a pulsed DC source or an AC source), the applied field 100 is depicted as a static electric field for ease of illustration. The applied field 100 has the effect of modifying the electrochemical bonds or moving the charges (depicted by the small arrows above and below the "charges" in the fluid in FIG. 2), which in turn causes the fluid to flow or to generate a pressure pulse 122. The flowing fluid or pulse produces a time-varying pressure gradient, which then propagates into the earth formation, through the subsurface, and upwardly to the sea floor 30 as a seismic wave (not shown). As used herein, "seismic wave" means any mechanical wave that propagates in the subsurface of the earth or sea and includes, but is not limited to, P- and S-waves.

The resulting seismic wave then travels upwardly into the water where it may be detected by the hydrophones and/or accelerometers in the first and/or second bottom cable. The signals representing the detection of the seismic wave will therefore be generated whenever the electric field encounters a porous formation, preferably of low permeability. These signals may be suitably recorded by a conventional seismic field recorder (not shown), usually contained on vessel 22. The seismic signals may, in turn, be processed according to conventional techniques to recover travel time, depth, and velocity information, as well as subsurface lithology or stratigraphy information. Such processing allows a determination of the number and depth of fluid-containing subsurface layers. Since the recording, analysis, and display of such data is well known in the art, it will not be discussed in any detail herein. In a similar manner, any detected electromagnetic signals may be detected, recorded, and/or processed.

The conducting sea water shields the antenna, i.e. the electrodes in the cables, from cultural and atmospheric noise. The background level of noise at the sea floor is reported to be very small, i.e. $10^{-12}$ volts per meter per root hertz above one hertz, which is more than one thousand times smaller than that found at the surface of the earth. So any electromagnetic signals detected in the sea water should have an improved signal-to-noise ratio over land signals.

However, the conductivity of sea water (5 siemen/meter) is not so large as to short out the propagating electroseismic electromagnetic signal. The electromagnetic skin depth (i.e., the depth to which an incident electromagnetic signal will propagate into a medium before loss of a significant amplitude) in sea water for the range of conventional seismic frequencies is typically greater than about 100 feet. Thus, electrodes placed within a few feet of the sea floor should detect a voltage or potential essentially equal to that on the sea floor or in the top sediment of the sea floor. Similarly, electric fields generated by active electrodes within a few feet of the sea floor will propagate into the sea floor with little attenuation in the water.

This lack of attenuation occurs because the sea water and bottom have about the same conductivity (or resistivity) and the electric field "sees" no contrast or discontinuity in electrical properties across this interface, as opposed to the marked discontinuity in bulk electrical properties at the earth's surface with the atmosphere. That is, even at the interface between the earth and the atmosphere, where there is a large discontinuity in bulk electrical properties, a small electric field from an electric field propagating upwardly in a conductive earth, (that is almost entirely reflected at the interface between the earth and atmosphere) may still be detected on the surface of the earth.

The effective antenna impedance of the receiver configuration of the present invention is reduced by the conducting sea water. That is, the electrodes have a low-resistance element (sea water) between the electrodes and cannot collect a charge for any extended period of time. This low impedance reduces the antenna sensitivity to low frequencies, which in turn reduces the noise level of the antenna/amplifier system.

Unlike land-based systems relying on acoustic/electric conversion, in which a signal may be generated at the surface by arriving acoustic waves, electromagnetic signals will not be generated in the sea water in the immediate neighborhood of the antenna in the modified streamer cable. However, there is possibly an electric field generated in bulk sea water by seismic waves compressing sea water and causing redistribution of ions, but this field is expected to be small.

Because of the foregoing the marine exploration system and methods of the present invention should be able to detect smaller electroseismic signals than a comparable onshore system.

The noise in electroseismic data that has been collected on land is dominated by random, large-amplitude electromagnetic pulses in the environment. These noises appear on all the antennas at the same time. Under these conditions, the employment of many shot repetitions and high data fold, such as are typical with conventional marine seismic techniques, may be expected to improve data quality.

As in land electroseismic prospecting, the offshore measurement should reveal information about gas-water and oil-water contacts and high permeability formation layers. In particular, the employment of an acoustoelectric conversion (i.e. using a seismic source in the sea and detecting the resulting electric field propagating from fluid-fluid or fluid-solid interfaces) is particularly useful to identify fluid-filled rocks of high porosity and/or permeability. Conversely, the electroacoustic measurements (i.e. those detecting the returned seismic signal resulting from an incident electric field) is believed to be useful for identifying the relatively impermeable formations which serve as hydrocarbon reservoir caps. A discussion of the efficacy with which low-permeability rocks generate electroacoustic seismic signals is given in the present assignee's pending application, Ser. No. 07/696,059, filing date May 6, 1991, and incorporated herein by reference. With the decreased noise and high fold of marine measurements the penetration should be at least as great as onshore measurements.

The electromagnetic signals radiated from depths will be attenuated by highly conducting sediments on the sea floor. Marine electroseismic prospecting may therefore not be particularly useful in the Gulf Coast where those sediments are deep, but may be particularly useful in hard bottom marine situations, such as offshore Alaska, where the sea floor is frozen or in situations having a hard rock sea floor.

For near vertical ray paths, the modified streamer cable employing the electromagnetic detectors will measure the horizontal component of the electric field returning from the geological substrata. Returning seismic energy with a horizontal pressure component will generate a horizontal electric field in the subsurface and in the sea water. For any hard sea floor situation, the antenna should measure the shear wave amplitude as it is converted to compressional waves at the sea floor. For soft sea floor sediments, the antenna should detect shear to compressional conversions at the bottom of the unconsolidated material. Horizontal seismic components will be detected and then stacked at appropriate seismic velocities appropriate for compressional or shear wave arrivals.

The detection of an acoustic response using the electroacoustic conversion of the present invention may also be useful in determining the depth of impermeable barriers below the sea floor and thereby indicate any lithologies that are capable of supporting mechanical structures such as offshore platforms. For example, the thickness of the frozen layer (frozen tundra) starting at the sea floor may be determined to allow for ray path adjustments to conventional seismic data. In addition, gas hydrates, which are rigid rocks with high shear velocities, may be easily detected by the methods of the present invention because of their contrast with the low velocity materials or layers around them.

Accordingly, the present invention provides a marine geophysical prospecting system. The marine geophysical prospecting system comprises a streamer cable modified to operate near the bottom of a body of water, a plurality of electromagnetic energy transceivers mounted on said cable, a plurality of acoustic energy detectors mounted on said cable, and at least one acoustic energy source.

Many other variations and modifications may be made in the techniques and apparatus hereinbefore described, by those having experience in this technology, without departing from the concepts of the present invention. Accordingly, it should be clearly understood that the methods and apparatus depicted in the accompanying drawings and referred to in the foregoing description are illustrative only and are not intended as limitations on the scope of the invention.

What is claimed is:

1. A marine geophysical prospecting system, comprising:

a streamer cable modified to operate near the bottom of a body of water, a plurality of electromagnetic energy transceivers mounted to said cable and disposed so as to contact said body of water, and at least one acoustic energy source.

2. The marine geophysical prospecting system of claim 1, further comprising, a second streamer cable modified to operate above said streamer cable and having electromagnetic energy transceivers.

3. The marine geophysical prospecting system of claim 1, further comprising:

a plurality of acoustic energy detectors mounted to said cable.

4. The marine geophysical prospecting system of claim 1, wherein said electromagnetic energy transceivers are adapted to detect electromagnetic energy resulting from subsurface conversion of acoustic energy from said acoustic energy source into electromagnetic energy.

5. The marine geophysical prospecting system of claim 1, wherein said electromagnetic energy transceivers are adapted to transmit electromagnetic energy downwardly into the formations below said body of water, and wherein said system further comprises at least one acoustic energy detector adapted to detect acoustic energy resulting from subsurface conversion of said electromagnetic energy into acoustic energy.

6. A marine geophysical prospecting system, comprising:

a streamer cable modified to operate near the bottom of a body of water, a plurality. of conductive electrodes disposed to contact said body of water mounted on said cable, a plurality of acoustic energy detectors mounted in said cable, and at least one acoustic energy source.

7. The marine geophysical prospecting system of claim 6, wherein said electrodes are spaced between 1 and 1000 feet apart.

8. The marine geophysical prospecting system of claim 6, further comprising, amplifier means for amplifying the electromagnetic waves detected by said electrodes.

9. A marine streamer cable comprising:

a plurality of weights affixed to the exterior or said cable for maintaining said cable at a preselected height above the bottom of a body of water and a plurality of electromagnetic energy transceivers mounted to said cable and disposed so as to contact said body of water.

10. The marine streamer cable of claim 9, further comprising, depth measuring means for ascertaining the depth at which said cable is operating above the bottom of said body of water.

11. The marine streamer cable of claim 9, further comprising:

a plurality of acoustic energy detectors mounted to said cable.

12. The marine streamer cable of claim 9, wherein said electromagnetic energy transceivers are adapted to detect electromagnetic energy.

13. The marine streamer cable of claim 9, wherein said electromagnetic energy transceivers are adapted to transmit electromagnetic energy downwardly into the formations below said body of water.

* * * * *